US008066242B2

(12) United States Patent
Potter et al.

(10) Patent No.: US 8,066,242 B2
(45) Date of Patent: Nov. 29, 2011

(54) SEPARATOR WITH INTEGRATED STORAGE FOR SECURING AN ELECTRICAL CHARGING DEVICE AND PROVIDING WIRE MANAGEMENT

(75) Inventors: William Potter, York, PA (US); Nicholas Warman, York, PA (US); Christopher Potter, York, PA (US)

(73) Assignee: Datum Filing Systems, Inc., Emigsville, PA (US)

( * ) Notice: Subject to any disclaimer, the term of this patent is extended or adjusted under 35 U.S.C. 154(b) by 503 days.

(21) Appl. No.: 12/287,748

(22) Filed: Oct. 14, 2008

(65) Prior Publication Data

US 2009/0109615 A1    Apr. 30, 2009

Related U.S. Application Data

(60) Provisional application No. 60/983,104, filed on Oct. 26, 2007.

(51) Int. Cl.
*A47F 5/00* (2006.01)
*A47H 1/10* (2006.01)

(52) U.S. Cl. ............ 248/300; 248/200; 248/51; 29/428; 29/559

(58) Field of Classification Search .................. 248/200, 248/300, 51; 29/428, 559
See application file for complete search history.

(56) References Cited

U.S. PATENT DOCUMENTS

| | | | | |
|---|---|---|---|---|
| 3,565,382 A | * | 2/1971 | Passarelli, Jr. ................. | 248/300 |
| 3,669,480 A | * | 6/1972 | Fugate ........................... | 403/400 |
| 5,366,194 A | * | 11/1994 | Finney .......................... | 248/218.4 |
| 5,598,680 A | * | 2/1997 | Wilhelmi ........................ | 52/715 |
| 5,810,303 A | * | 9/1998 | Bourassa et al. ............ | 248/205.1 |
| 6,008,621 A | * | 12/1999 | Madison et al. .............. | 320/107 |
| 6,629,391 B1 | * | 10/2003 | Børresen et al. ................ | 52/200 |
| 7,038,126 B2 | | 5/2006 | Solet | |
| 7,055,833 B2 | | 6/2006 | Wixted | |
| 7,130,190 B1 | * | 10/2006 | Baker ............................ | 361/695 |
| 7,160,113 B2 | | 1/2007 | McConnell | |
| 7,429,023 B2 | * | 9/2008 | Morrow ......................... | 248/300 |
| 7,520,474 B1 | * | 4/2009 | Condon ........................... | 248/56 |
| 7,868,250 B2 | * | 1/2011 | Kolada ............................ | 174/53 |
| 7,883,098 B2 | * | 2/2011 | Lee ........................... | 280/124.128 |
| 2003/0116685 A1 | * | 6/2003 | Jensen .......................... | 248/200 |
| 2005/0092886 A1 | * | 5/2005 | Mazieres ....................... | 248/300 |
| 2006/0071131 A1 | * | 4/2006 | Young et al. .................. | 248/200 |
| 2007/0049071 A1 | | 3/2007 | Jackson | |

* cited by examiner

*Primary Examiner* — Terrell McKinnon
*Assistant Examiner* — Michael McDuffie
(74) *Attorney, Agent, or Firm* — Kollas and Kennedy; James W. Kollas, Esq.

(57) ABSTRACT

A separating device with integrated storage securing an electrical charging device and providing wire management for portable computers, such as notebook computers or laptop computers, in a cart, pedestal, desk-mounted depot, or similar devices is shown herein. Briefly stated, in its preferred embodiment, the separating device comprises a sheet of rigid material with a thin thickness cut in a roughly trapezoidal profile, a plurality of holes, a plurality of tabs, and a plurality of slots. The separating device is designed to accept a portable computing device and its charging device. Wires running from the charging device to the portable computing device are fed through the separating device for wire management. Wires running from the charging device to a power plug are wrapped around the separating device for further wire management. Also, the separating device may be attached to a device capable of accepting the separating device.

19 Claims, 13 Drawing Sheets

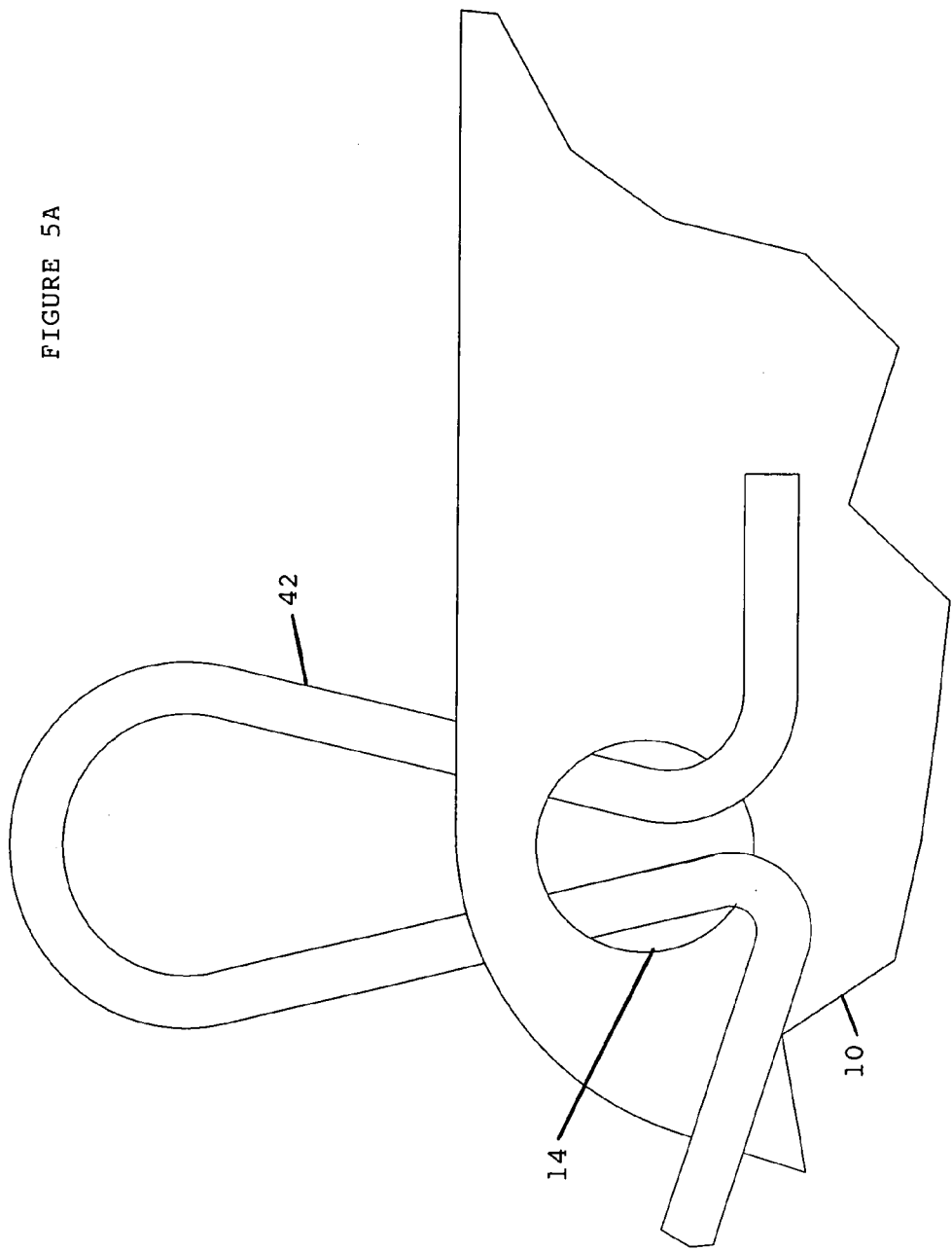

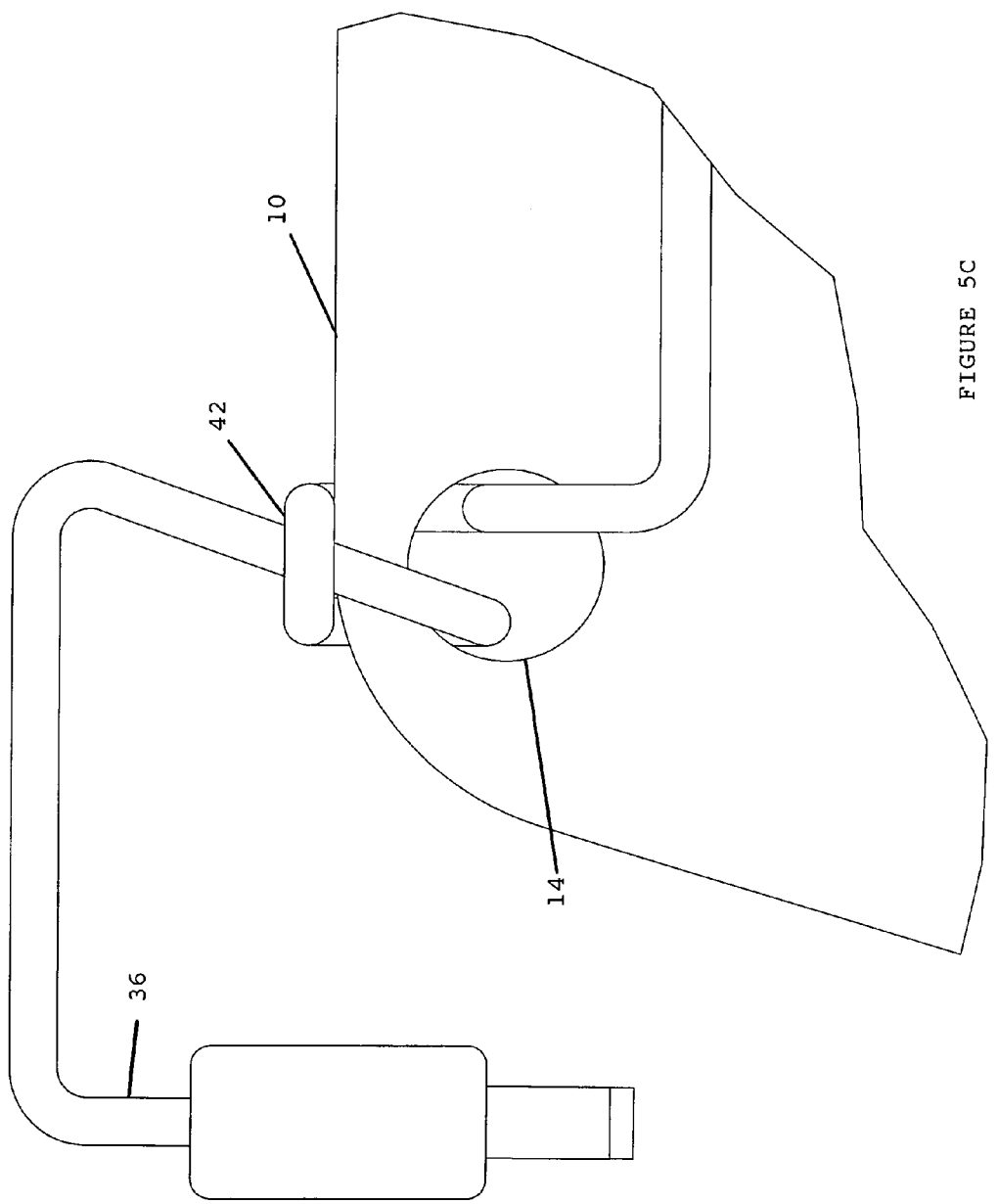

SEPARATOR WITH INTEGRATED STORAGE FOR SECURING AN ELECTRICAL CHARGING DEVICE AND PROVIDING WIRE MANAGEMENT

CROSS-REFERENCE TO RELATED APPLICATIONS

This application claims the benefit of provisional patent application Ser. No. 60/983,104, filed Oct. 26, 2007, which is incorporated herein by reference.

STATEMENT REGARDING FEDERALLY SPONSORED RESEARCH OR DEVELOPMENT

Not applicable.

BACKGROUND

1. Field of the Invention

This invention is directed toward the field of separator devices. More particularly, this invention relates to a separating device with integrated storage securing an electrical charging device and providing wire management for portable computers, such as notebook computers or laptop computers, in a cart, pedestal, desk-mounted depot, or similar devices.

2. Discussion of Prior Art

Many businessmen, students, and other individuals use portable notebook or laptop computers. Such portable computers are typically used remotely, drawing power from a battery. When a user finishes using a portable computer, typically the battery in the portable computer is thereafter in need of recharging. Often, the portable computer itself must be placed in a secure location while the battery is being charged.

Many devices have been proposed over the years to provide a place to store and charge the battery of a portable computer. For instance, in U.S. Patent Application 2007/0049071 A1 to Jackson shows a simple charging apparatus. Although the apparatus includes docking bays and docking stations, it is basically a series of pull-out shelves with electrical contacts. It does not address wire management in detail.

U.S. Pat. No. 7,160,113 to McConnell shows a slightly more sophisticated mobile teaching system, which includes internal shelves and divider. However, the internal shelves and dividers are simple features in the overall invention.

In U.S. Pat. No. 7,130,190 to Baker, a computer servicing cart is shown. Although this device implements vertically adjustable shelves, it does not allow for horizontal adjustment. Wire management is not discussed in great detail.

In U.S. Pat. No. 7,055,833 to Wixted another computer storage cart device is illustrated. Once again, although shelves are mentioned, they are not described in detail. As such, the shelves may be taken as simple feature in the overall invention.

In U.S. Pat. No. 7,038,126 to Solet, a cable/wire and electronic device storage container is shown. Said device includes rigid divider which is removably attached. However, the divider is not fitted with ventilation holes, nor does it receive and fasten a power source, such as a power brick, for the electronic devices used in conjunction therewith.

In U.S. Pat. No. 6,008,621 to Madison, a portable computer charging system and storage cart is shown. This invention has dividers which appear to be simple wires or tubes, and are not described in detail. Thus, they may be taken as simple features of the overall invention As such, there is a void in the prior art in the field of separating devices. The prior art lacks a separating device with integrated storage securing an electrical charging device and providing wire management of laptop computers in a laptop cart, pedestal, or desk-mounted depot. The present invention fills this void.

BRIEF SUMMARY OF THE INVENTION

In accordance with the present invention, a separating device with integrated storage securing an electrical charging device and providing wire management of portable computers in a cart, pedestal, desk-mounted depot, or other similar devices is shown herein. Briefly stated, the separating device comprises a sheet of rigid material with a thin thickness cut in a roughly trapezoidal profile, a plurality of holes, a plurality of tabs, and a plurality of slots.

OBJECTS AND ADVANTAGES

Accordingly, the objects and advantages of the invention are:

A) to provide a separating device with integrated storage securing an electrical charging device and providing wire management for portable computers, such as notebook computers or laptop computers, in a cart, pedestal, desk-mounted depot, or similar devices;

B) to provide a separating device with integrated storage securing an electrical charging device and providing wire management which may accept a power brick and related wires to the facilitate overall wire management;

C) to provide a separating device with integrated storage securing an electrical charging device and providing wire management which allows for greater ventilation via a plurality of holes formed on the device; and D) to provide a separating device with integrated storage securing an electrical charging device and providing wire management which may be fitted within a storage compartment in a cart, pedestal, desk-mounted depot, or similar devices;

Further objects and advantages are to provide a separating device with integrated storage securing an electrical charging device and providing wire management which may be removably attached to a storage compartment in a cart, pedestal, desk-mounted depot, or similar devices. Still further objects and advantages will become apparent from consideration of the ensuing description and drawings.

BRIEF DESCRIPTION OF THE DRAWINGS

FIG. 5A is Cut-Away Side View Illustrating Wire Management—Loop FIG. 5C is Cut-Away Side View Illustrating Wire Management—Tightened Loop

REFERENCE NUMERALS IN DRAWINGS

Figure 1:
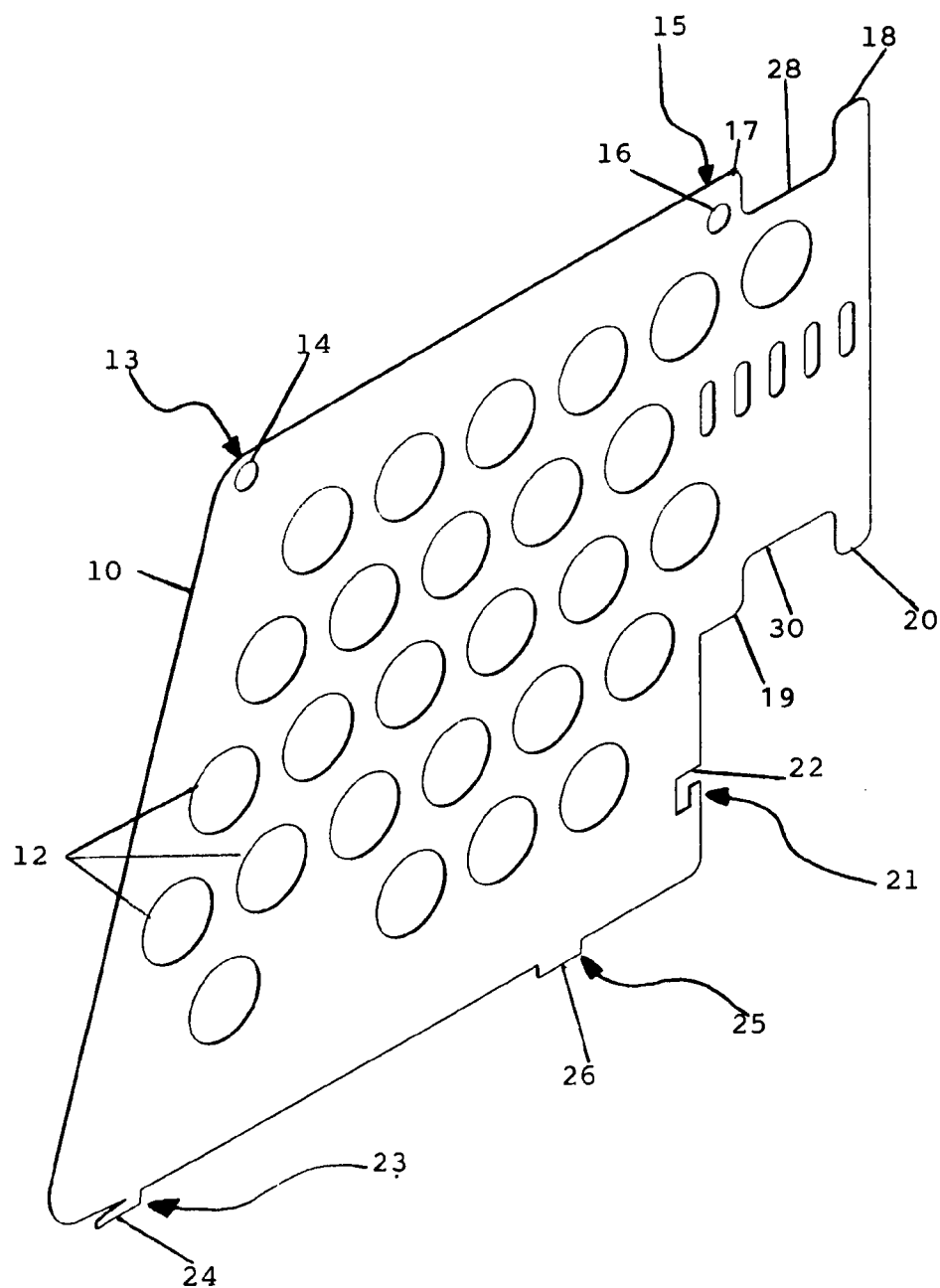
FIG. 1 is an Isometric View of the Preferred Embodiment of the Separating Device

10 Sheet
12 Ventilation holes
13 Front guiding means
14 Front wire hole
15 Rear guiding means
16 Rear wire hole
17 Inner upper tab
18 Outer upper tab
19 Inner lower tab
20 Outer lower tab
21 Paint-line hanging means
22 Rear slot
23 Front attaching means
24 Front tab
25 Rear attaching means
26 Rear tab
28 Upper cut-away region
30 Lower cut-away region
32 Portable computing device
33 Electrical charging means
34 Power brick
36 Power wire
38 Wire slack
40 First loop
42 Second loop
44 Plug wire
46 Plug wire slack
48 Power plug socket (not illustrated)
50 Wire fastening means
51 Wire fastener
52 Front receiving slot
53 Front receiving means
54 Rear receiving slot
55 Rear receiving means
56 Cart

DETAILED DESCRIPTION OF INVENTION

In its most simple configuration, the separating device with integrated storage securing an electrical charging device and providing wire management comprises four basic elements. Briefly stated, the separating device comprises a sheet of rigid material with a thin thickness cut in a roughly trapezoidal profile, a plurality of holes, a plurality of tabs, and a plurality of slots.

The preferred embodiment of the invention is shown in FIG. 1. In the preferred embodiment, a thin, rigid sheet 10 is cut in a roughly trapezoidal profile. A plurality of ventilation holes 12 are cut, drilled, punched, or otherwise formed on rigid sheet 10. At the top of sheet 10, are a front guiding means 13 and a rear guiding means 15, which are preferably a front wire hole 14 and a rear wire hole 16, respectively. On the rear portion of sheet 10 are an inner upper tab 17, an outer upper tab 18, an inner lower tab 19 and an outer lower tab 20. Below outer lower tab 20, a paint-line hanging means 21, preferably a rear slot 22, is formed in sheet 10. At the bottom of sheet 10, are a front attaching means 23 and a rear attaching means 25, which are preferably a front tab 24 and a rear tab 26, respectively.

Preferably, between inner upper tab 17 and outer upper tab 18 is an upper cut-away region 28. Similarly, between inner lower tab 19 and outer lower tab 20 is a lower cut-away region 30.

Figure 3:
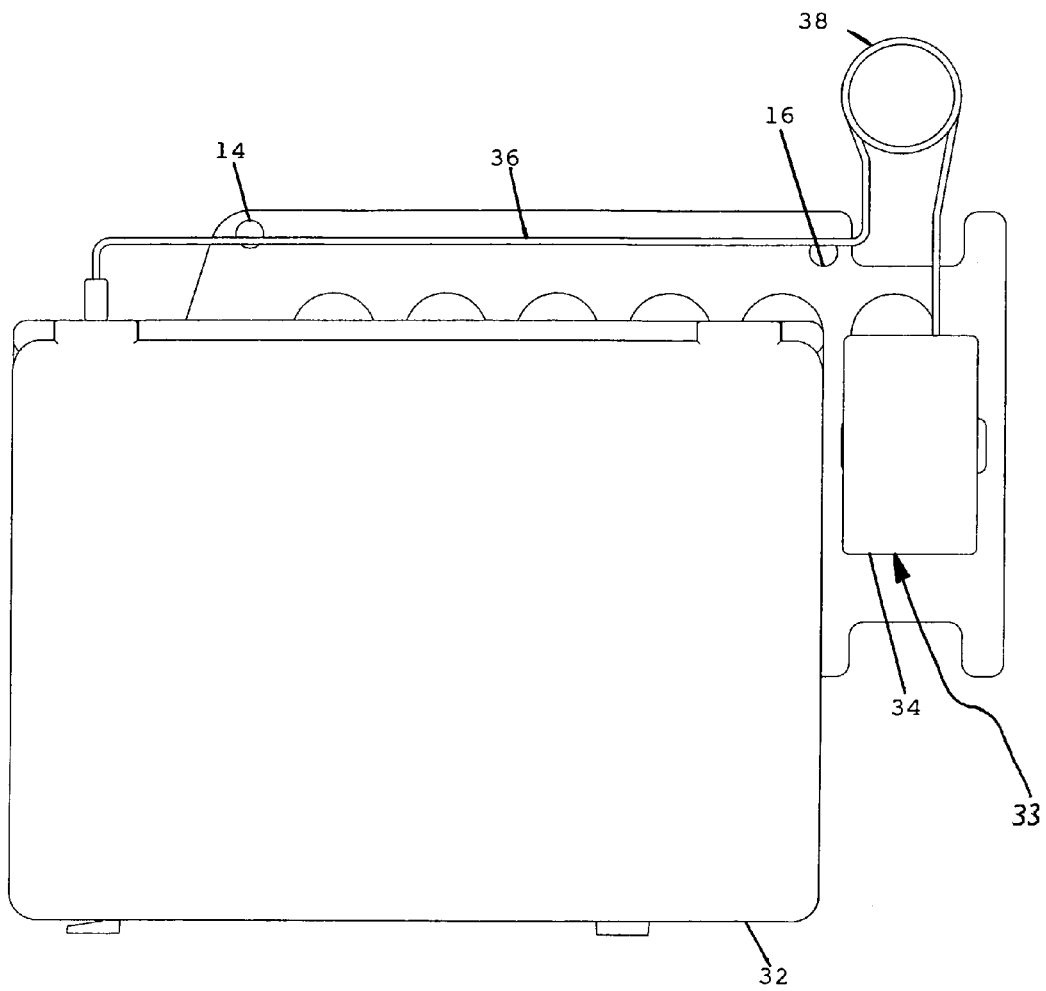
FIG. 3 is a Side View of the Separating Device with Portable Computer Placement, Power Brick Placement, and Wire Management

To use the separating device with a portable computing device 32, a series of steps are to be followed. First, the separating device is laid flat on a work surface, and a user supplied portable computing device 32 is placed atop sheet 10, as shown in FIG. 3. Additionally, an electrical charging means 33, preferably a user supplied power brick 34, is placed on sheet 10 between upper cut-away region 28 and lower cut-away region 30. Power wire 36, leading from power brick 34 to portable computing device 32, is laid across front wire hole 14 and rear wire hole 16. Preferably, sufficient wire slack 38 is left in power wire 36 for plugging power wire 36 into portable computing device 32 and for taking the following steps.

Figure 4A:
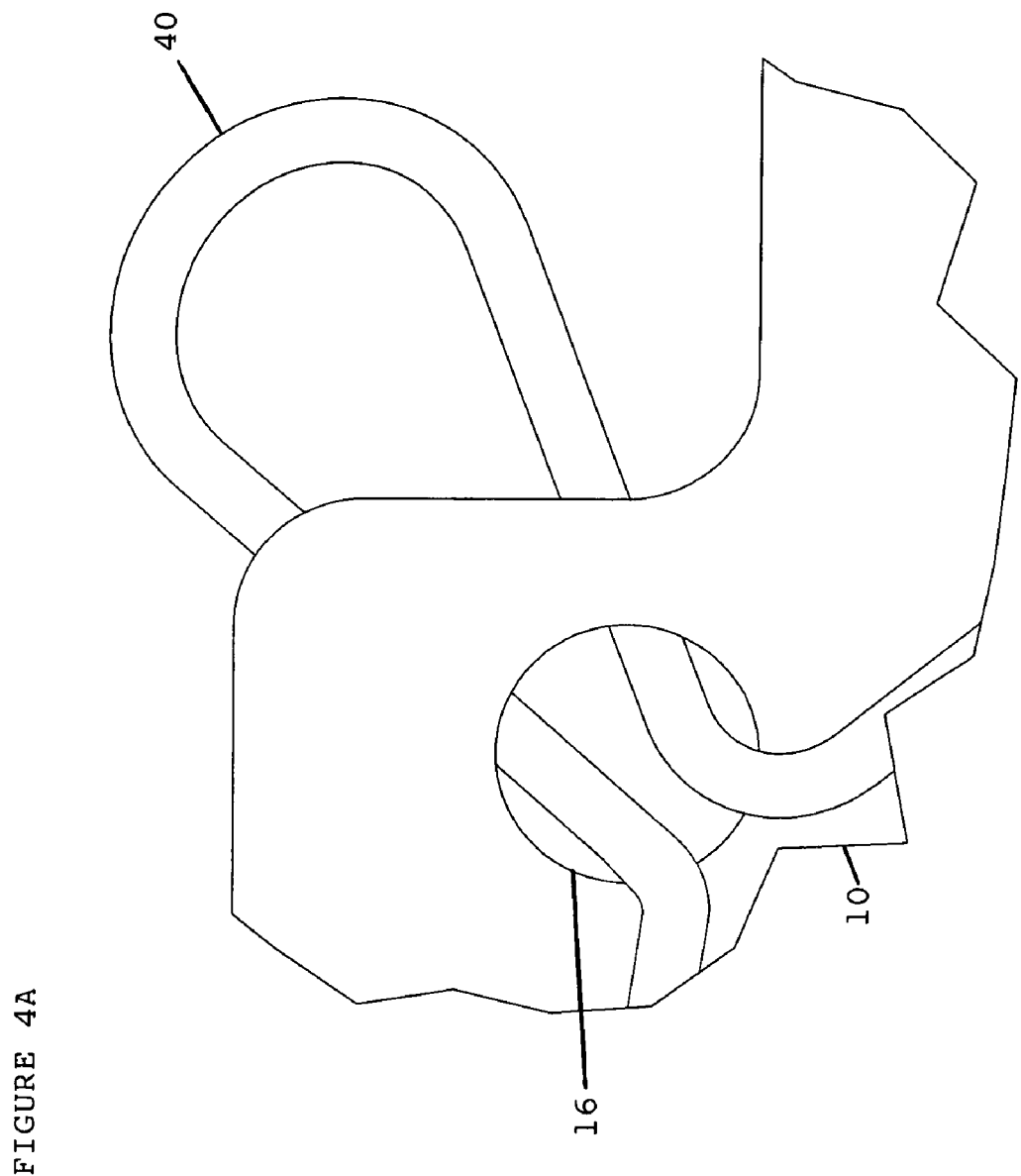
FIG. 4A is Cut-Away Side View Illustrating Wire Management—Loop
Figure 4B:
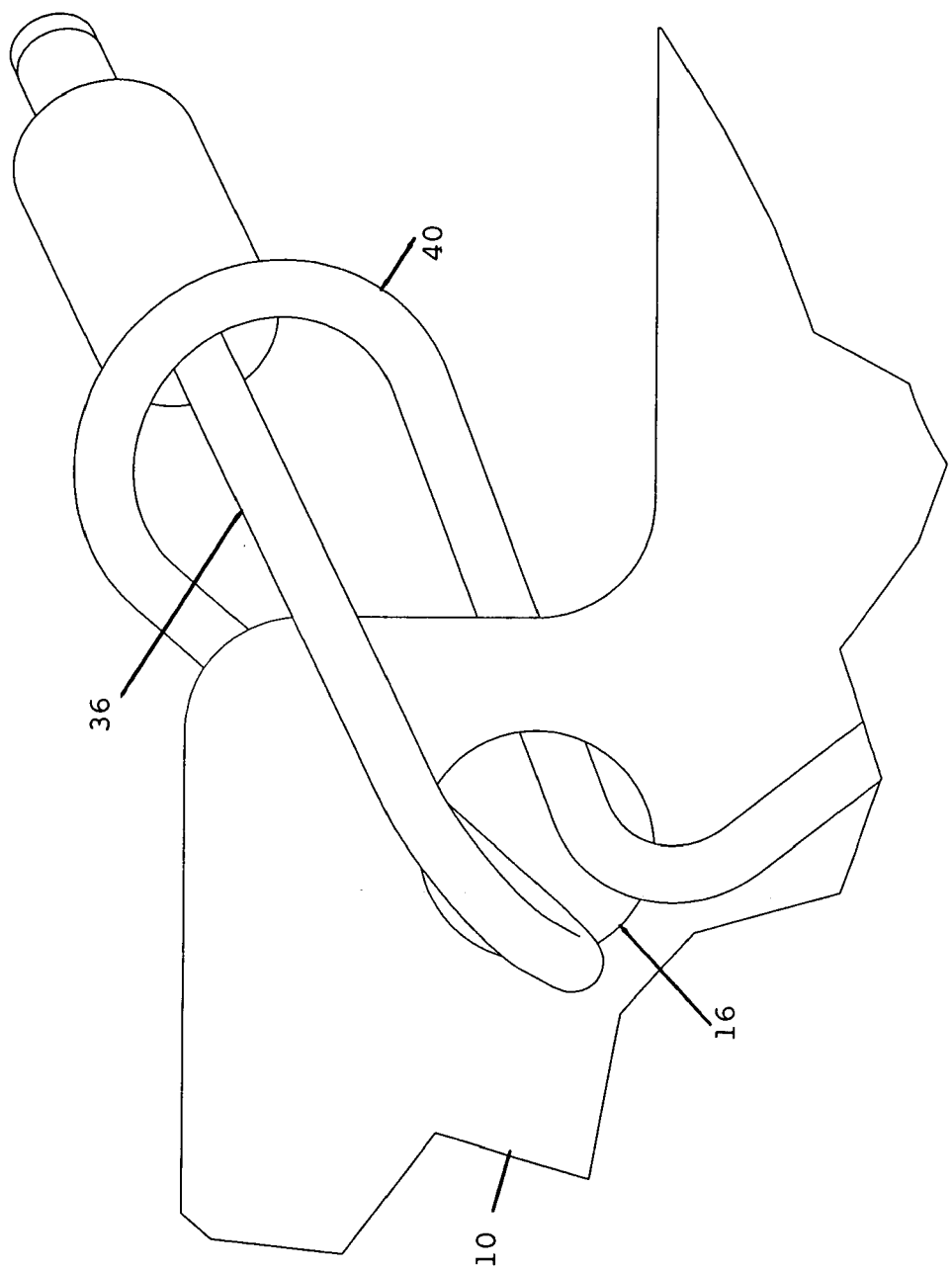
FIG. 4B is Cut-Away Side View Illustrating Wire Management—Threaded Loop
Figure 4C:
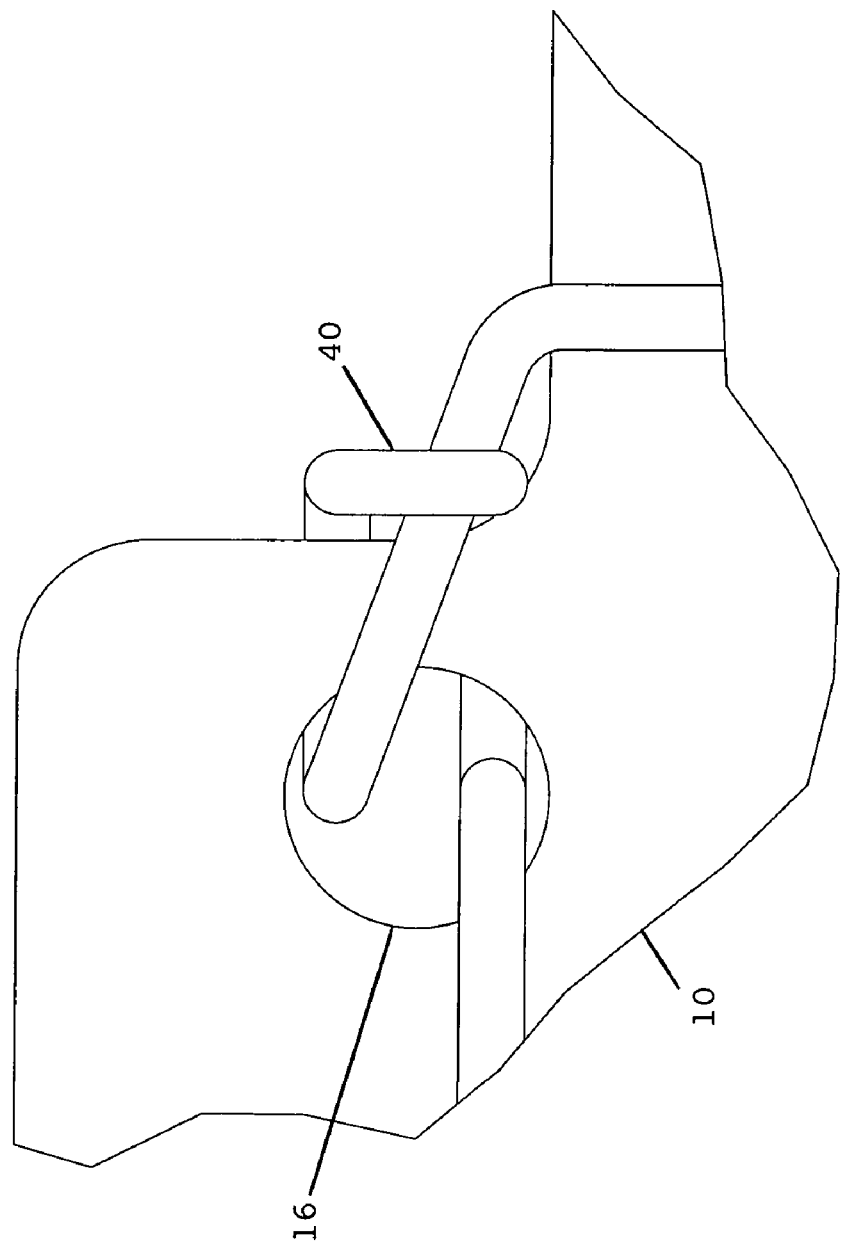
FIG. 4C is Cut-Away Side View Illustrating Wire Management—Tightened Loop

Second, power wire 36 is bent into a first loop 40 and fed through rear wire hole 16, as shown in FIG. 4A. Then, the end of power wire 36 is fed through first loop 40, as shown in FIG. 4B. First loop 40 is to remain to the side of rear wire hole 16, facing upper cut-away region 28. Thereafter, first loop 40 is tightened as shown in FIG. 4C.

Figure 5B:
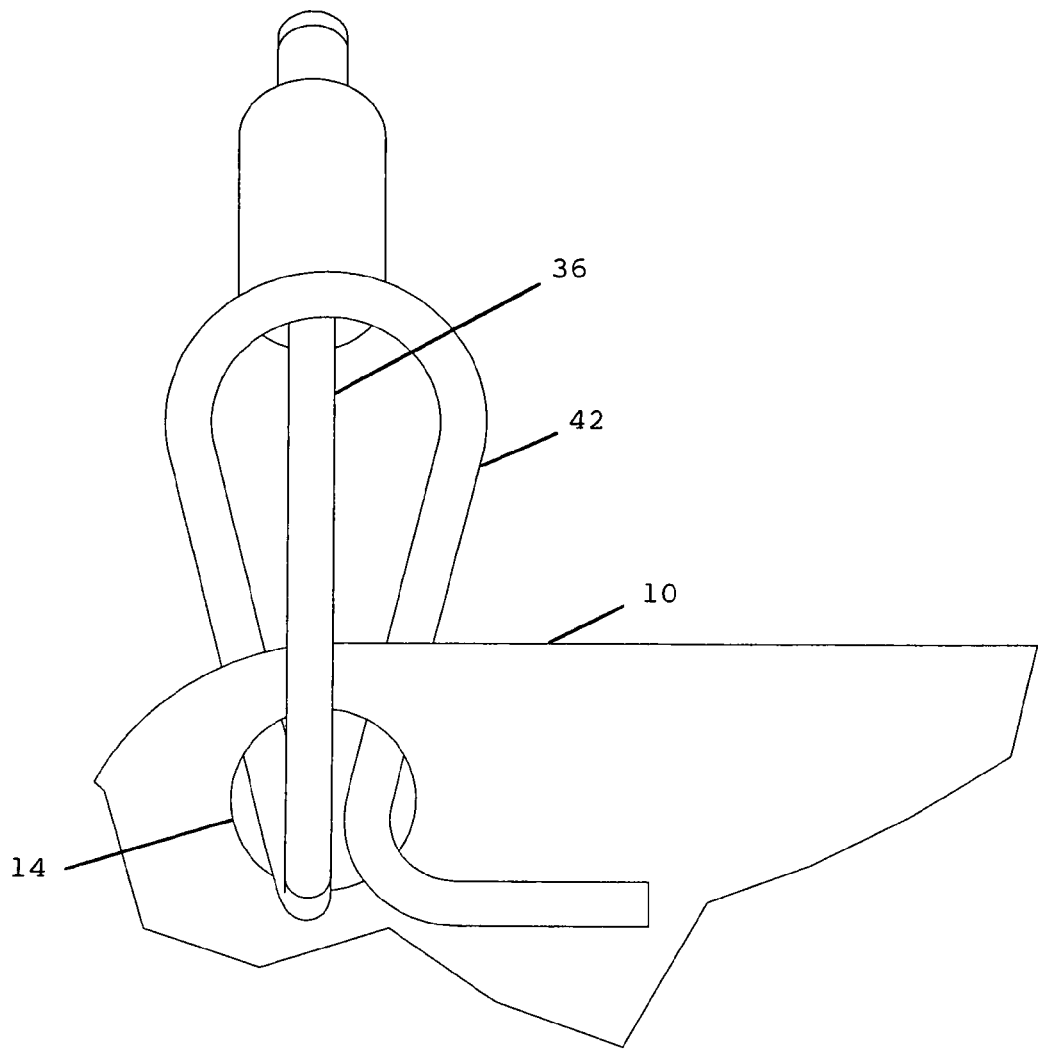
FIG. 5B is Cut-Away Side View Illustrating Wire Management—Threaded Loop

Third, power wire 36 is taken to front wire hole 14. Next, power wire 36 is bent into a second loop 42 and fed through front wire hole 14, as shown in FIG. 5A. Then, the end of power wire 36 is fed through second loop 42, as shown in FIG. 5B. Second loop 40 is to remain to the top of sheet 10. Thereafter, second loop 42 is tightened as shown in FIG. 5C.

Figure 2:
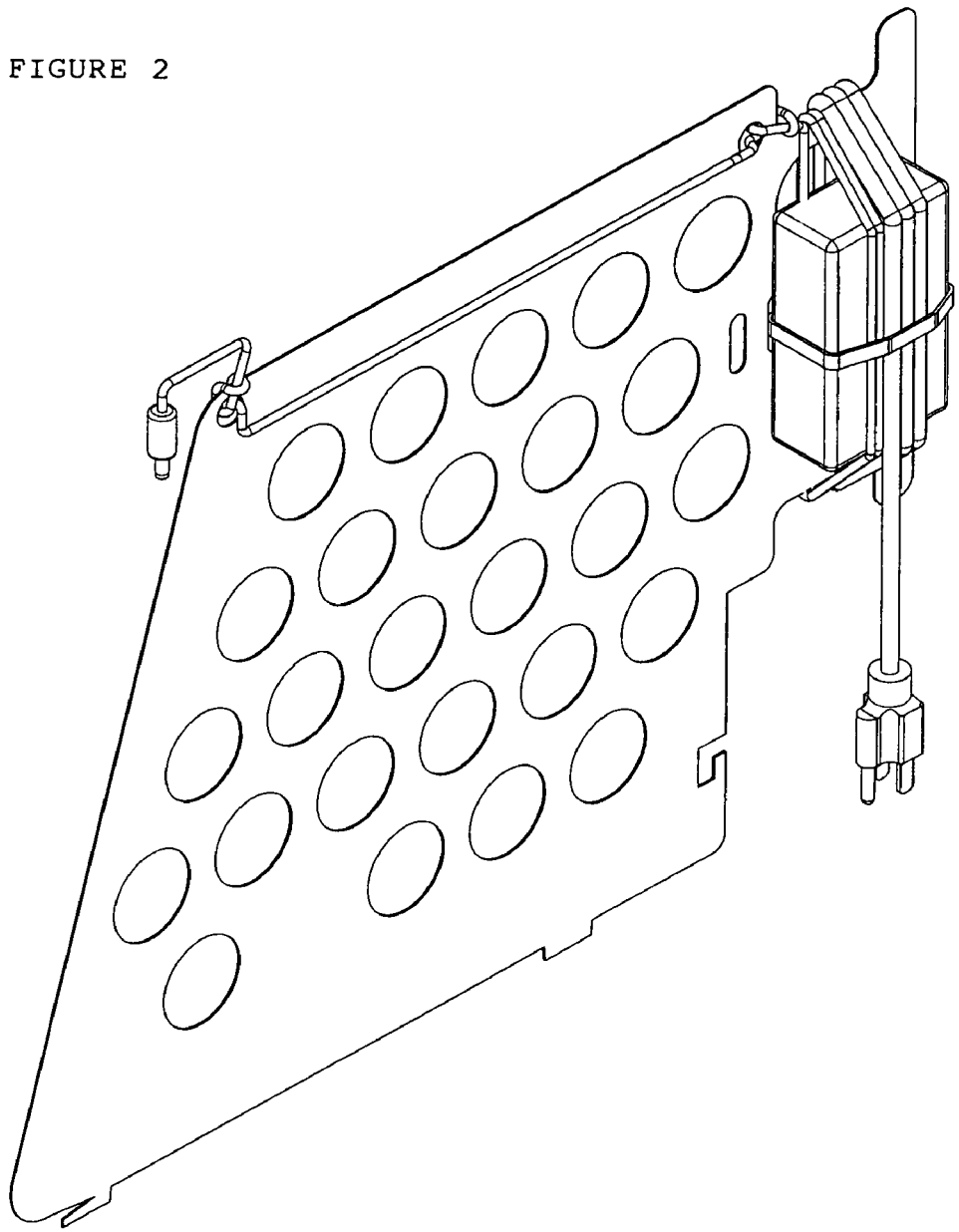
FIG. 2 is an Isometric View of the Separating Device Illustrating Wire Management
Figure 6:
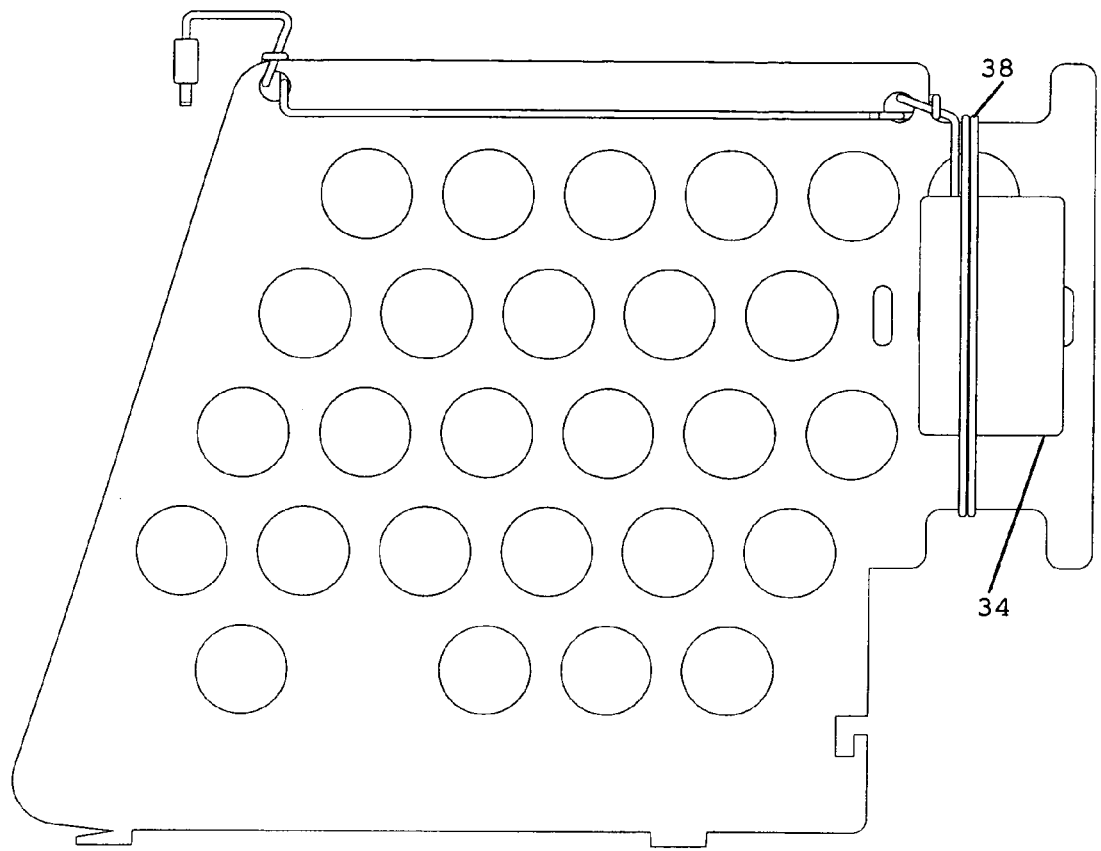
FIG. 6 is a Side View of the Separating Device with Power Brick Placement and Preliminary Wire Management
Figure 7:
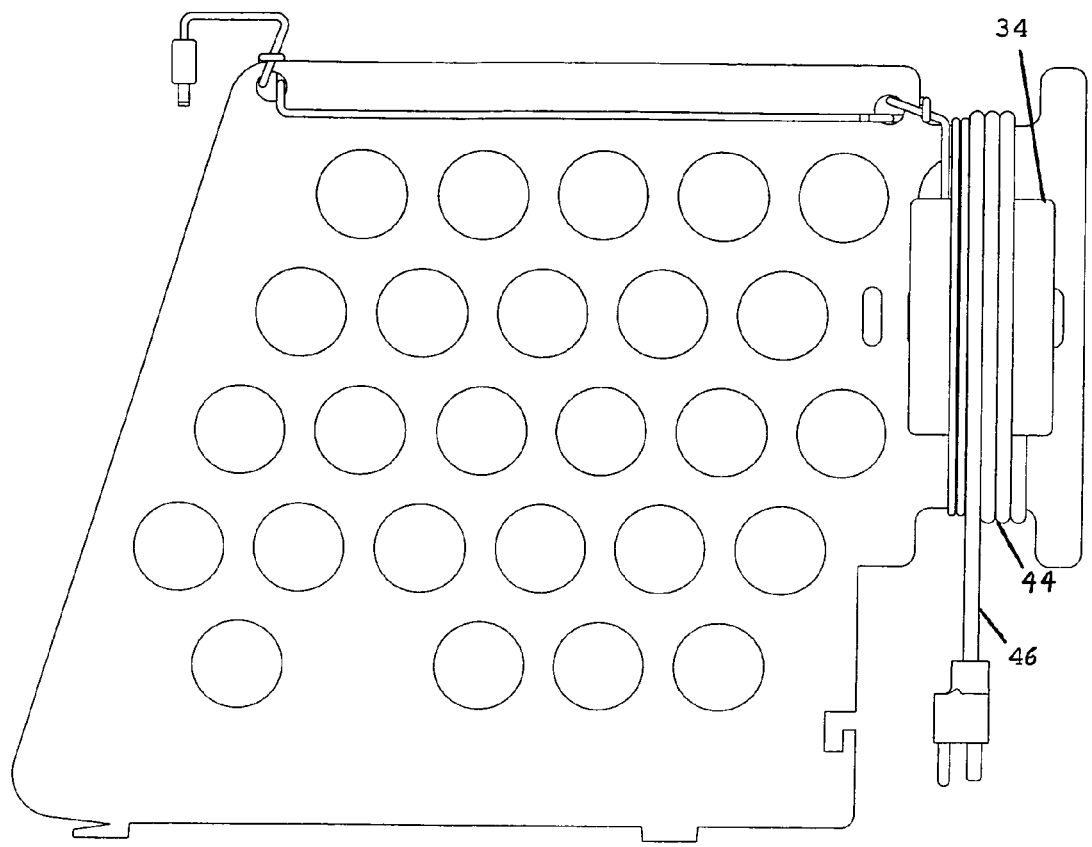
FIG. 7 is a Side View of the Separating Device with Power Brick Placement and Intermediate Wire Management

Fourth, any remaining wire slack 38 may be wrapped around power brick 34, as shown in FIG. 6. Inner upper tab 17 and outer upper tab 18 restrict wire slack 38 within the upper cut-away region 28, while inner lower tab 19 and outer lower tab 20 restrict wire slack 38 within the lower cut-away region 30, as shown in FIG. 2. Next, plug wire 44 is also wrapped around power brick 34 leaving enough plug wire slack 46 to reach power plug socket 48 (not illustrated) as shown in FIG. 7.

Figure 8:
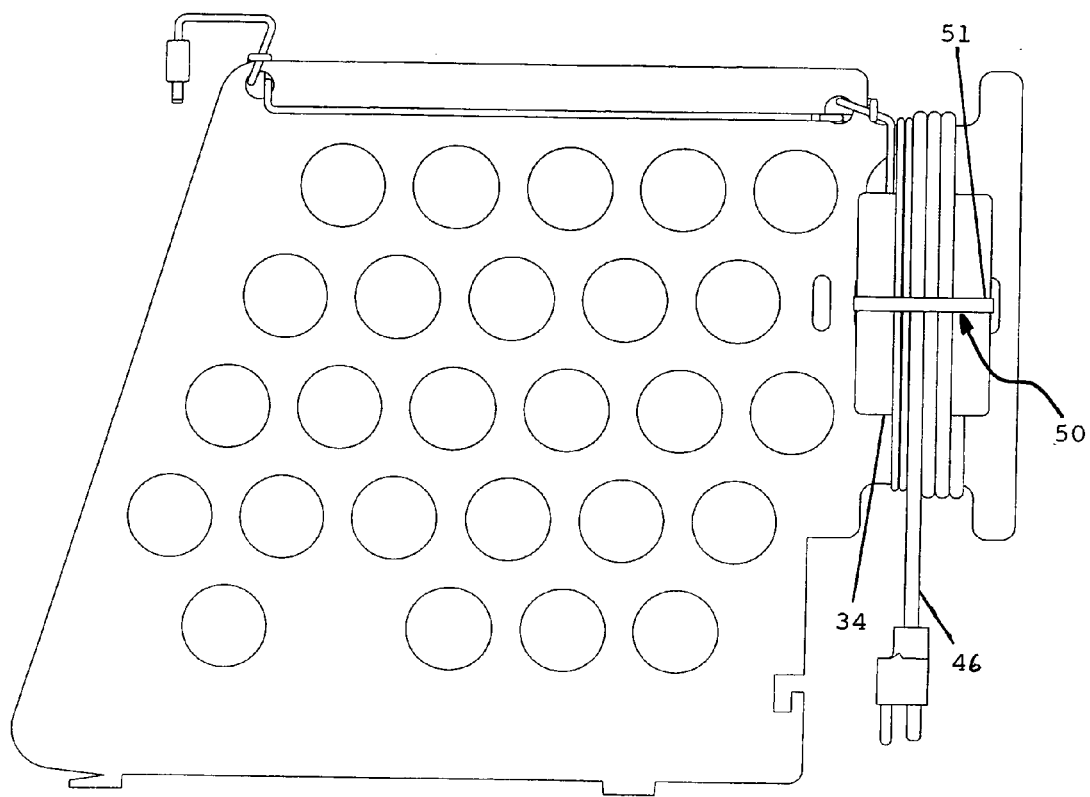
FIG. 8 is a Side View of the Separating Device with Power Brick Placement and Advanced Wire Management

Fifth, as needed, the wires wrapped around power brick 34 may be secured to power brick 34 via a wire fastening means 50 as shown in FIG. 8. Preferably, wire fastening means 50 is a zip tie, band tie, or other wire fastener 51 common in the prior art.

To secure the separating device to a cart, pedestal, desk-mounted depot, or similar device, a user takes the following steps. First, the device to which the separating device shall be mounted shall be formed, equipped, or otherwise modified to accept sheet 10, front tab 24, rear tab 26, and rear slot 22. That is, the space in which the separating device shall be mounted must be of sufficient size to accommodate the separating device. Moreover, the device accepting the separating device shall have means to accept front tab 24 and rear tab 26.

Figure 9:
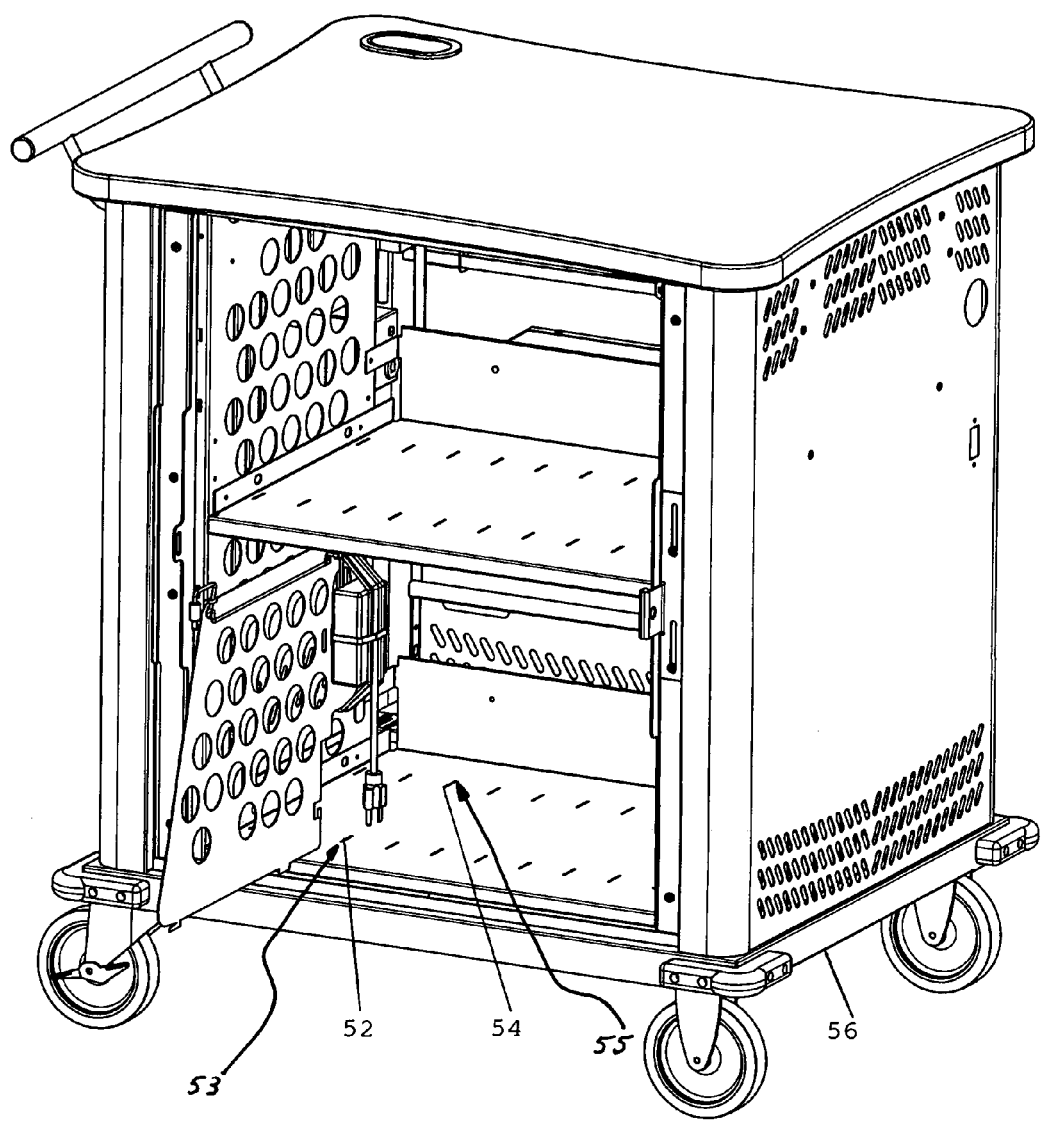
FIG. 9 is as Isometric view of the Separating Device Approaching Placement within a Device Capable of Accepting the Separating Device

Second, to mount the separating device, preferably, the user shall vertically align sheet 10 within a plane defined by a front receiving means 53 (preferably a front receiving slot 52) and a rear receiving mean 55 (preferably a rear receiving slot 54) located on the device accepting the separating device, preferably a cart 56. Once the alignment is made, the separating device shall be rotated to the front, forming an angle of open space along the line of the bottom tabs on sheet 10 and the front receiving slot 52 and the rear receiving slot 54 of cart 56. Next, front tab 24 is inserted into front receiving slot 52. Then the device is pulled forward so that "L" portion of front tab 24 runs first through front receiving slot 52 and then under the material bordering front receiving slot 52. Thereafter, rear tab 26 is inserted into rear receiving slot 54. See FIG. 9.

At this point, the separating device stands vertically within the space defined by the device accepting the separating device. As space allows, multiple separating devices may be fitted to the device accepting the separating device.

Alternative Embodiments

While the above description contains many specificities, these should not be construed as limitations on the scope of the invention, but rather as an exemplification of one preferred embodiment thereof. Many variations are possible and some are as follows.

First, the materials used in the separating device with integrated storage securing an electrical charging device and providing wire management can be wood, metal, plastic, composite, or other materials commonly used in shelving unit storage, office furniture, or similar industries. Different materials allow differing strengths and weaknesses which would be used to match consumer preferences, needs, and budget restraints.

Second, the separating device may be bent, once or more, in uniform or varying degrees, in order to increase strength, rigidity, and similar physical attributes of the device.

Third, the size, arrangement, and number of ventilation holes may be modified. Depending on the characteristics of the separating device that a user may require, it is a simple matter to modify the size, arrangement, and number of ventilation holes.

Fourth, similarly the size, arrangement, and number of wire holes at the top of sheet 10 may be modified as a user may require. Depending on the characteristics of the separating device that a user may require, it is a simple matter to modify the size, arrangement, and number of wire holes.

The embodiments above-discussed are to be considered illustrative and not restrictive. Many more embodiments may be configured using combinations of the embodiments above-discussed. Thus, the scope of the invention should be determined by the appended claims and their legal equivalents.

CONCLUSIONS, RAMIFICATIONS, AND SCOPE

The utility of the separating device with integrated storage securing an electrical charging device and providing wire management is apparent. The separating device provides integrated storage, securing an electrical charging device, and provides wire management for portable computers, such as notebook computers or laptop computers, in a cart, pedestal, desk-mounted depot, or similar devices. Moreover, with its plurality of holes, the separating device facilitates ventilation between it and the portable computing device and electrical charging device attached to it in storage. Furthermore, the separating device is easily removably attached to a device capable of accepting the separating device.

The above-discussion is to be considered illustrative and not restrictive. Thus, the scope of the invention should be determined by the appended claims and their legal equivalents.

We claim:

1. A separating device comprising, in combination:
   a. a rigid sheet,
   b. a plurality of holes,
   c. a front guiding means for guiding a wire from an electrical charging means to a portable computing device,
   d. a rear guiding means for guiding a wire from an electrical charging means to a portable computing device,
   e. an inner upper tab,
   f. an outer upper tab,
   g. an inner lower tab,
   h. an outer lower tab,
   i. a paint-line hanging means for allowing the separating device to be hung on a paint-line,
   j. a front attaching means for attaching the separating device to a cart, pedestal, desk-mounted depot, or similar devices,
   k. a rear attaching means for attaching the separating device to a cart, pedestal, desk-mounted depot, or similar devices,
   l. an upper cut-away region, and
   m. a lower cut-away region.

2. The device of claim 1 wherein said front guiding means comprises a front wire hole.

3. The device of claim 1 wherein said rear guiding means comprises a rear wire hole.

4. The device of claim 1 wherein said paint-line hanging means comprises a rear slot.

5. The device of claim 1 wherein said front attaching means comprises a front tab.

6. The device of claim 1 wherein said rear attaching means comprises a rear tab.

7. The device of claim 1 wherein said electrical charging means comprises a power brick.

8. A method for providing wire management with a separating device, comprising the steps of:
   a. providing the separating device of claim 1,
   b. placing a portable computing device on said separating device,
   c. placing a user supplied electrical charging means on said separating device,
   d. laying a user supplied power wire from said electrical charging means across a rear guiding means and a front guiding means,
   e. looping said power wire through said rear guiding means,
   f. tightening said power wire against said rear guiding means,
   g. looping said power wire through said front guiding means,
   h. tightening said power wire against said front guiding means,
   i. wrapping any remaining slack of said power wire around said electrical charging means and said separating device,
   j. wrapping a user supplied plug wire from said electrical charging means around said electrical charging means and said separating device, leaving a sufficient length of said plug wire for reaching a power plug socket,
   k. securing the wrapped power wire and wrapped plug wire to the electrical charging means and separating device via a wire fastening means,
      whereby wire management of said power wire and said plug wire is accomplished.

9. The method of claim 8 wherein said electrical charging means comprises a power brick.

10. The method of claim 8 wherein said front guiding means comprises a front wire hole.

11. The method of claim 8 wherein said rear guiding means comprises a rear wire hole.

12. The method of claim 8 wherein said wire fastening means comprises a wire fastener.

13. A method for providing wire management with a separating device, comprising the steps of:
   a. providing the separating device of claim 1,
   b. placing a portable computing device on said separating device,
   c. placing a user supplied power brick on said separating device,
   d. laying a user supplied power wire from said power brick across a rear wire hole and a front wire hole,
   e. looping said power wire through said rear wire hole,
   f. tightening said power wire against said rear wire hole,
   g. looping said power wire through said front wire hole,
   h. tightening said power wire against said front wire hole,
   i. wrapping any remaining slack of said power wire around said power brick and said separating device,
   j. wrapping a user supplied plug wire from said power brick around said power brick and said separating device, leaving a sufficient length of said plug wire for reaching a power plug socket,
   k. securing the wrapped power wire and wrapped plug wire to the power brick and separating device via a wire fastener, whereby wire management of said power wire and said plug wire is accomplished.

14. A method for attaching a separating device to a device capable of receiving said separating device, comprising the steps of:
   a. providing the separating device of claim 1,
   b. providing a device capable of receiving said separating device,
   c. fitting a front receiving means onto the device capable of receiving said separating device,
   d. fitting a rear receiving means onto the device capable of receiving said separating device,
   e. aligning the separating device in a vertical plane along the front attaching means and rear attaching means of the separating device with the front receiving means and the rear receiving means of the device capable of receiving said separating device, respectively,
   f. rotating said separating device to the front, thereby forming an angle of open space along the line of said front attaching means, said rear attaching means, said front receiving means and said rear receiving means,
   g. inserting said front attaching means into said front receiving means,
   h. pulling the separating device forward so that a portion of said front attaching means runs through said front receiving means and then under the surface of material forming said front receiving means,
   i. inserting said rear attaching means into said rear receiving means whereby the separating device rests securely within the space provided by the device capable of receiving said separating device.

15. The method of claim 14 wherein said front receiving means comprises a front receiving slot.

16. The method of claim 14 wherein said rear receiving means comprises a rear receiving slot.

17. The method of claim 14 wherein said front attaching means comprises a front tab.

18. The method of claim 14 where said rear attaching means comprises a rear tab.

19. A method for attaching a separating device to a device capable of receiving said separating device, comprising the steps of:
   a. providing the separating device of claim 1,
   b. providing a cart capable of receiving said separating device,
   c. forming a front slot onto said cart,
   d. forming a rear slot onto said cart,
   e. aligning the separating device in a vertical plane along the front tab and rear tab of said separating device with the front slot and the rear slot of said cart,
   f. rotating said separating device to the front, thereby forming an angle of open space along the line of said front tab, said rear tab, said front slot and said rear slot,
   g. inserting said front tab into said front slot,
   h. pulling the separating device forward so that a portion of said front tab runs through said front slot and then under the surface of material forming said front slot,
   i. inserting said rear tab into said rear slot,
   whereby the separating device rests securely within the space provided by the device capable of receiving said separating device.

* * * * *